June 30, 1925.
J. SLEPIAN
ELECTROLYTIC CELL
Filed Dec. 22, 1919
1,543,729
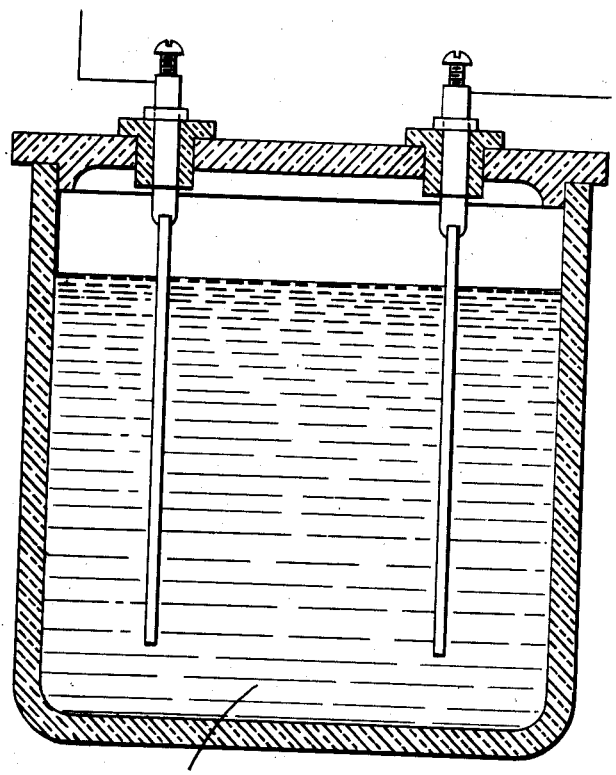
An electrolyte containing a protective colloid
WITNESSES:
INVENTOR
Joseph Slepian
BY
ATTORNEY Patented June 30, 1925.

1,543,729

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTROLYTIC CELL.

Application filed December 22, 1919. Serial No. 346,649.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Electrolytic Cells, of which the following is a specification.

My invention relates to valve cells of the electrolytic type and, more particularly, to the electrolytes of electrolytic condensers, rectifiers, lightning arresters and the like, and it has, for its primary object, the provision of a means for stabilizing the film produced upon electrodes of the various film-forming materials commonly employed in such cells.

Tests have led me to believe that, during the course of formation of the films upon electrodes of film-forming material, by the employment of alternating currents, there is a large increase in the internal surface of the porous films or, in other words, a decrease in the size of the particles of which they are composed. This, in turn, suggests that the loss of formation of a valve cell, on open circuit, may be occasioned by the growth or coagulation of the particles of the porous films on the electrodes to particles of larger size, since the internal surfaces of the porous films or surfaces of the interstices would thereby be materially decreased, when the cell is on open circuit. If the foregoing theory is correct, it would account for the diminished efficiency of the cell after it has been on open circuit for a considerable period.

The object of my present invention, therefore, resides in the provision of means for stabilizing the films on the electrodes by preventing growth of the particles comprising the films.

Certain substances, which are known to colloid chemists as protective colloids, have the property of rendering other colloids more stable and have a deterrent effect upon their coagulating or growing to larger particles. I propose, therefore, to improve valve cells of the electrolytic type by the addition of a suitable quantity of any proper protective colloid to the electrolyte of the cell.

In practicing my invention, I may employ any one of a number of known protective colloids, such as gelatine, agar agar, albumen, gum arabic or the like in conjunction with any of the commonly employed electrolytes. For example, I may add from 1% to 1.5% of gelatine to an electrolytic comprising a dilute solution of boric acid and ammonium borate, or to an electrolyte comprising a dilute solution of ammonium borate. Either of the electrolytes thus formed will give satisfactory results in use.

Obviously, I do not wish to restrict myself to the employment of any particular electrolyte or any specific protective colloid or to the exact proportions of the colloid to be used in any case. Naturally, the percentage of colloid to be employed will depend upon the various electrolytes to which it is added and upon the particular colloid resorted to. For example, if agar agar is employed, with either of the electrolytes above specified, good results may be obtained by the addition of approximately .5% of the colloid to the electrolytic bath.

I have found that the addition of a suitable amount of a protective colloid to any of the commonly employed electrolytes greatly improves the electrolyte. For example, a valve cell embodying an electrolyte containing a protective colloid, together with electrodes of film-forming material, such as aluminum, magnesium, titanium or the like, is much more desirable than a similar cell employing any of the customary electrolytes without the addition of a colloid. For example, the films form much more rapidly under the action of alternating current, upon the electrodes of the valve cell embodying my improved electrolyte than is the case with a valve cell having the same electrolyte without the added colloid. Furthermore, the films thus formed are much less affected by open-circuit conditions. Both these features are of great importance in electrolytic cells in general, and, particularly, in lightning arresters which are left for considerable periods of time on open circuit.

The accompanying drawing is a diagrammatic view of a cell embodying my invention.

Although I have described my present invention in considerable detail, giving several examples of protective colloids which may be employed and pointing out a number of well known electrolytes to which they may be added, it will be appreciated that my invention is one of broad scope and that no limitations are to be imposed upon it other than those indicated in the claims.

I claim as my invention:—

1. In an electrolytic valve cell, an electrolyte containing a protective colloid.

2. In an electrolytic valve cell, an electrolyte containing gelatine.

3. An electrolytic cell, such as a condenser, lightning arrester, rectifier and the like comprising electrodes, an electrolyte co-operating therewith to form a colloidal film thereon, and means in the electrolyte for retarding coagulation of the film.

4. An electrolytic cell, such as a condenser, rectifier, lightning arrester and the like comprising electrodes, an electrolyte co-operating therewith to form a colloidal film thereon, and means in the electrolyte for governing the size of the colloidal particles constituting the film.

5. An electrolytic cell, such as a condenser, rectifier, lighting arrester and the like comprising electrodes, an electrolyte co-operating therewith to form a colloidal film thereon, and means in the electrolyte for keeping down the size of the colloidal particles comprising the film.

6. An electrolytic cell, such as a condenser, rectifier, lightning arrester and the like comprising electrodes, an electrolyte co-operating therewith to form a film thereon and a protective colloid in the electrolyte for stabilizing the film.

7. An electrolytic cell comprising electrodes, an electrolyte co-operating with the electrodes to form a film thereon and gelatine in the electrolyte.

In testimony whereof, I have hereunto subscribed my name this 18th day of December 1919.

JOSEPH SLEPIAN.